United States Patent [19]

Maejima et al.

[11] Patent Number: 4,639,224

[45] Date of Patent: Jan. 27, 1987

[54] MULTIPLE PROJECTOR PLANETARIUM DRIVE SYSTEM

[75] Inventors: Takeshi Maejima, Toyokawa; Kenji Shiba, Toyohashi, both of Japan

[73] Assignee: Minolta Camera Kabushiki Kaisha, Osaka, Japan

[21] Appl. No.: 727,651

[22] Filed: Apr. 26, 1985

[30] Foreign Application Priority Data

Apr. 30, 1984 [JP] Japan ................. 59-86949

[51] Int. Cl.$^4$ ............................. G09B 27/00
[52] U.S. Cl. ................................. 434/286
[58] Field of Search ................. 434/286, 285

[56] References Cited

U.S. PATENT DOCUMENTS

| | | | |
|---|---|---|---|
| 3,074,183 | 1/1963 | Frank | 434/286 |
| 3,256,619 | 6/1966 | Frank | 434/286 |
| 3,571,954 | 3/1971 | Frank | 434/286 |
| 3,574,955 | 4/1971 | Skolnick | 434/286 |
| 3,934,358 | 1/1976 | Kitano et al. | 434/286 |
| 4,020,568 | 5/1977 | Tajima et al. | 434/286 |

Primary Examiner—William H. Grieb
Attorney, Agent, or Firm—Wolder, Gross & Yavner

[57] ABSTRACT

A planetarium includes a fixed star field projector and a plurality of planet projectors spaced from the star field projector. A computerized control controls the rotation of the projectors, each of the planet projectors being controlled in its rotation about a pair of perpendicular axes alternatively in two modes, in the first mode the projected image traversing normal apparent orbital or other path in the star field and in the second mode the image traversing the shortest path from an initial point to a terminal point in the star field which points represent different times and/or points of observation.

13 Claims, 12 Drawing Figures

MULTIPLE PROJECTOR PLANETARIUM DRIVE SYSTEM

BACKGROUND OF THE INVENTION

The present invention relates to a planetarium, and more particularly to a planetarium in which planet projectors are driven with by an improved system.

An existing planatarium is constituted to simulate the diurnal motion, annual motion, precessional motion and the latitude adjustment of the fixed stars, Sun, Moon and planets as observed from the earth. To simulate such motions, a pair of star field projectors which project fixed stars of the North spherical heaven and South spherical heaven and respective projectors for projecting the Sun, Moon and respective planets were mounted on a frame in the existing planetarium and this frame was rotated around three axes. Each projector is coupled to the annual motion drive axis provided within the frame through a gear system and thereby each of the projectors moves in conjunction with each other in accordance with the rotation of the annual motion drive axis. The planetarium constituted as explained above is disclosed, for exmple, in U.S. Pat. No. 3,934,358 and U.S. Pat. No. 4,020,568.

However, the above drive mechanism drives respective projectors through the gear systems in interlocking relation and therefore when the projectors are driven so as to move projected celestial bodies from a position at a certain time to a position at another time, the gear systems must be rotated for the simulated time period of such difference, taking a very longer time.

For example, as shown in FIG. 1, in the case of the moving of two celestial bodies located at the positions $a_1$, $b_1$ to the positions $a_2$, $b_2$, two celestial bodies have to make the annual motions respectively through orbits A, B as much as the difference in time between the both positions. If such annual motion is simulated during 10 seconds/year through the gear system, the annual motions for 1000 years consumes about 2 hours and 47 minutes.

Therefore, it has substantially been impossible to shift a certain celestial body to a very distant time from the present time in the existing planetarium.

Moreover, it has also been impossible in the existing planetarium to simulate a starry sky observed from the Moon or other planets.

The planetariums which have overcome the restrictions on time and space are proposed by U.S. Pat. No. 3,256,619 and U.S. Pat. No. 3,571,954. These patents disclose a structure where the star field projecting portion for projcting the fixed stars in the sky and the projectors for projecting the Sun, Moon and planets are individually driven. Since the planetarium described in these patents does not execute interlocked operations by gear systems, the projected positions of the planets at the present time can be shifted to projected positions of other times or the viewer position can also be shifted to other desired positions. However, these patents do not disclose how the projectors are driven for a change of time or viewer position.

SUMMARY OF THE INVENTION

Accordingly, it is an object of the present invention to provide a planetarium where the planet projectors are driven by an improved method.

It is another object of the present invention to provide a planetarium which can change the time of projection or viewer position by driving the planet projectors in such a way as to move in the shortest path without relation to the actual motion of the planets.

These and other objects can be attained by selectively switching to alternative modes, a trace and a quick mode for correspondingly controlling the drive of the planet projectors. In the trace mode, the motion of the planets are simulated along their orbits, while in quick mode, the motions of the planet projectors are controlled, when changing the projection time or viewer position, so that the path between the starting position and the target position is along the shortest route in place of the orbits of the planets.

More specifically, the planet projectors are driven as the combined motion about two axes and the amount of drive about these axes can be calculated by a computing means. More desirably, the two axes of the planet projectors are arranged so that the plane including both axes is below the projection range on the dome and thereby the singular point where the motion of the projected images is not continuous is set outside of the projection range, resulting in no problem on projection.

BRIEF DESCRIPTION OF THE DRAWINGS

These and other objects and features of the present invention will become apparent from the following descritpion of a preferred embodiment thereof taken in conjunction with the accompanying drawings, in which.

DETAILED DESCRIPTION OF THE PREFERRED EMBODIMENT

Figure 1:
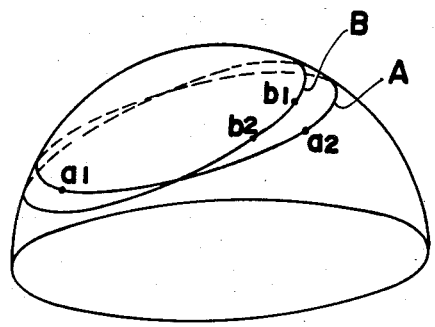
FIG. 1 schematically shows the motions of the planets in the planetarium of the prior art, FIG. 2 schematically shows a cross section indicating the structure of the dome of the planetarium of the present invention.
Figure 2:
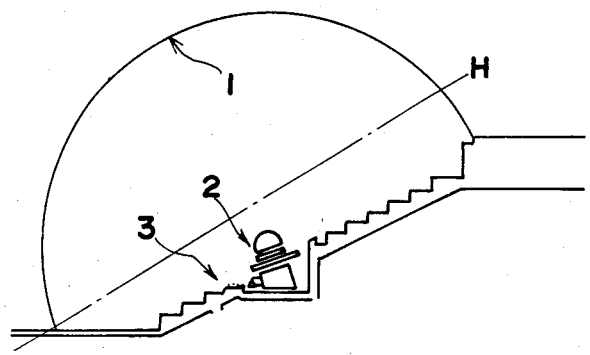
Figure 3:
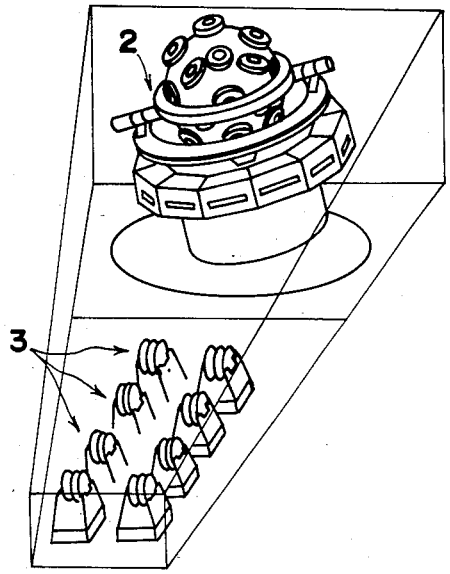
FIG. 3 is a perspective view indicating the arrangement of the star field projector and the planet projectors of the planetarium of the present invention.

With reference to FIG. 2 and FIG. 3, the planetarium of the present invention is composed of a star field projector 2 and projectors 3, 3, . . . for the Sun, Moon and respective planets (Mercury, Venus, Earth, Mars, Jupiter and Saturn) arranged in the vicinity of star field projector 2. The viewers' seats provided within the dome are arranged in the form of a stair-case and the projection range on the dome 1 is located at the upper part of the projection limit H indicated by a broken line inclined to the horizon. The projectors 3, 3, . . . are different from each other only in the projection objects and have the same structure for moving the projected images. Therefore, these are called hereafter a planet projector.

Figure 4:
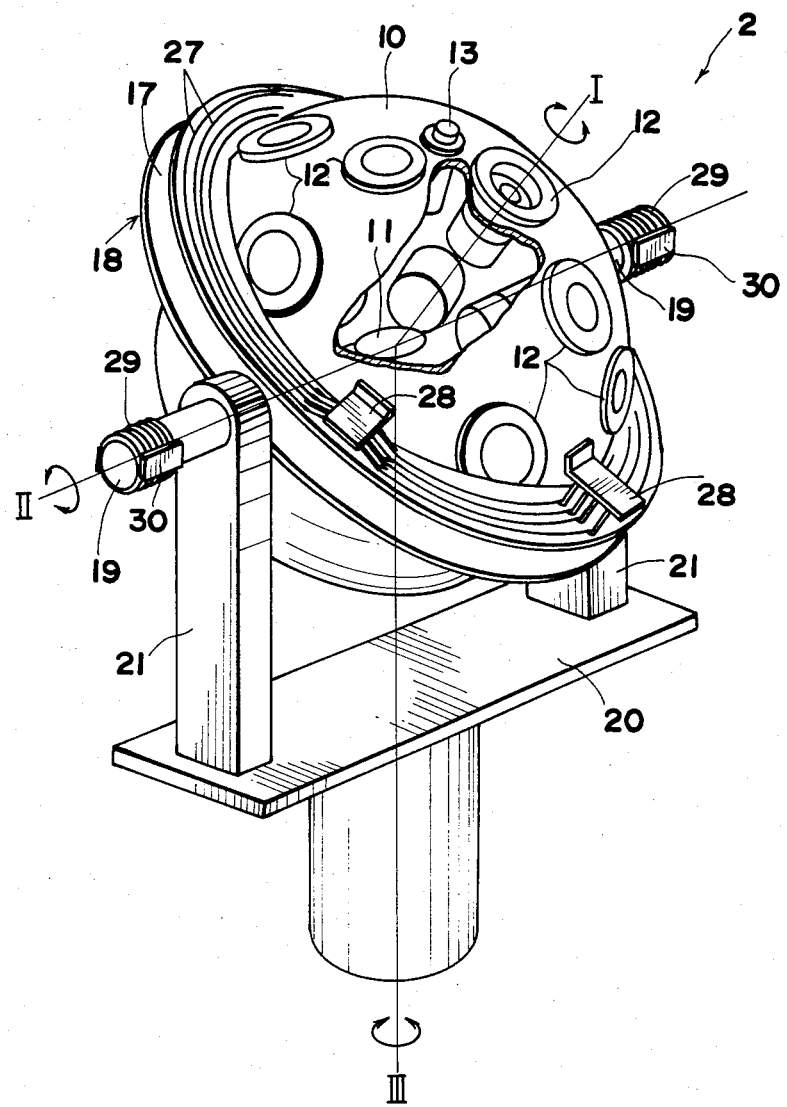
FIG. 4 and FIG. 5 are, respectively, a perspective view and a cross section indicating the star field projector of the planetarium of the present invention.
Figure 5:
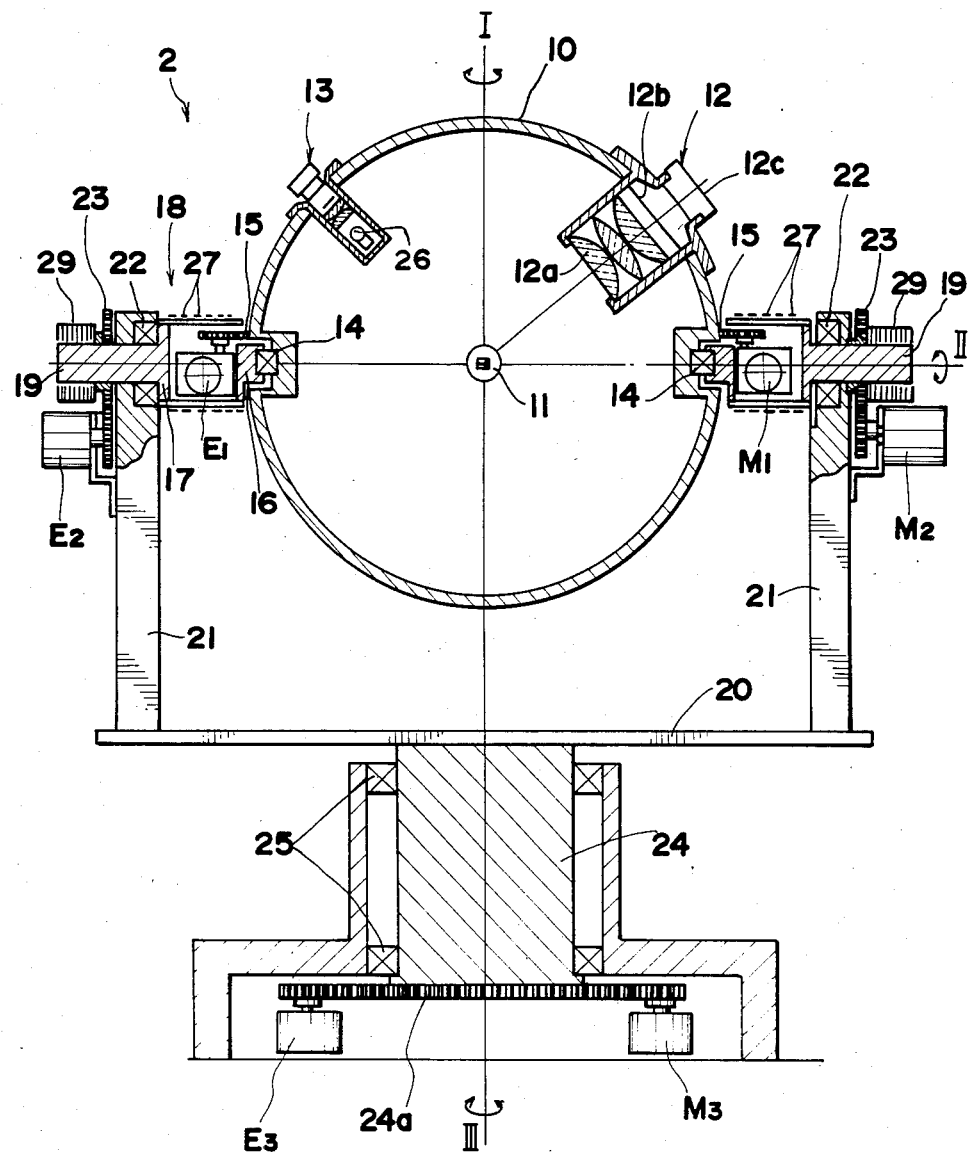

With reference to FIG. 4 and FIG. 5, the star field projector 2 will be explained below. The star field projector 2 has a star projection ball or sphere 10 which is freely rotated around three axes. The star projection sphere 10 has at its center a light source 11 for projecting fixed stars, a plurality of lens units 12 which project fixed stars in the sky through the lenses and a plurality of auxiliary projection units 13 which are disposed in the spaces between these units 12 for projecting coordinate marks, constellation picture and bright stars, etc. Each projection lens unit 12 is composed of a condenser lens 12a, and original plate of fixed stars 12b having many pin holes and a projection lens 12c for projecting the fixed stars within the divided plural sectors.

The three axes of the projector 2 are the first axis I which is perpendicular to a great circle containing the fixed star projecting ball 10, the second axis II which passes through the center of the ball and is horizontal and the third axis III which passes through the intersection point of the axes I and II and is vertical. At the external circumference of said great circle, a bearing 14 and a gear 15 are provided along axis I. The gear 15 is coupled to the first axis drive motor $M_1$ and the first axis encoder $E_1$, which are provided wtihin an annular holder 18. The fixed star projection ball 10 is held by the annular holder 18 constructed from an internal ring 16 for holding the bearing 14, an external ring 17 and a rib (not shown) for connecting the internal and external rings. The fixed star projection ball 10 is also rotatable around the axis II through the rotation of the annular holder 18 around horizontal shafts 19. The horizontal shafts 19 are supported by the bearings 22 carried by supporting members 21. This rotation is ensured by the structure in which the second axis drive motor $M_2$ fixed to the support member 21 rotates the horizontal shaft 19, and simultaneously the second axis encoder $E_2$ provided in the same way detects rotation around the second axis II. Depending from the center of a cross piece or substrate 20, is the perpendicular shaft 24 which is supported by a bearing 25 and the gear part 24a of perpendicular shaft 24 is coupled with the third axis drive motor $M_3$ and the third axis encoder $E_3$.

The power to the light source 11 and the light source 26 individually provided to th each auxiliary projection unit 13 is supplied through slip rings 27 provided on both sides of annular holder 18, brushes 28 which slidingly engage slip rings 27 slip rings 28 provided at the circumference of horizontal shaft 19 and brushes 30 slidingly engaging slip rings 27. A similar slip ring and brush (not shown) are also provided for the perpendicular shaft 24.

The fixed stars are projected by the fixed star projecting ball 10, as explained above, and in this case, at least the light source 11 is lit continuously. Therefore, an annular shutter (not shown) having a special structure is provided surrounding the fixed star projecting ball 10 in order to cut the projecting light emitted toward the lower part of the horizontal line on the projection.

Figure 6:
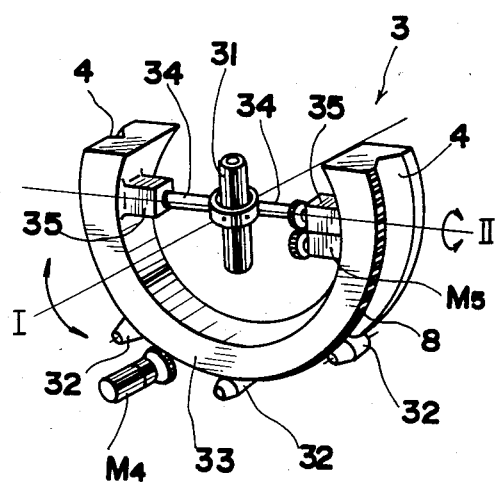
FIG. 6 is a perspective view indicating a planet projector used in the planetarium of the present invention, FIG. 7 schematically shows the control for the planetarium of the present invention.

FIG. 6 shows the structure of planet projectors 3, 3, . . . . A projector 31 is supported rotatably around two axes which orthogonally intersect each other. Specifically, an arcute member 33 is supported by rollers 32, 32 provided on a support member (not shown) and is freely rotatable around an axis I in a horizontal plane and is rotated by motor $M_4$ provided on the support member. The projector 31 is fixed to a shaft 34 extending along a diameter of arcuate member 33 and rotatably supported by bearings 35, 35 and rotated by a motor $M_5$ fixed to arcuate member 33. Thereby, the shaft 34 rotates around the axis II orthogonally crossing the axis I and the projector 31 can be directed to the desired direction by such rotations.

Generally, there is a singular point in the combined motion of two axes where continuous movement is impossible and at such a point rotation of the one axis is impossible until the end of rotation of the other axis. However, in the case of plane projectors 3, 3 . . . , the projected image can be substantially continuously moved by setting the position corresponding to such singular point to the outside of the projection range which is lower than the limit of projection H.

As shown in FIG. 2, since the projection range of the dome is tilted in the illustrated embodiment of the present invention, the plane including the axis I and axis II may be tilted parallel to the limit H of projection.

The star field projector 2 is driven by the combined movement of three axes, while the planet projectors 3, 3 . . . by the combined movement of two axes and thereby images can be projected in the desired direction. Diversified projection effects can be obtained by individually controlling these projectors.

Figure 7:
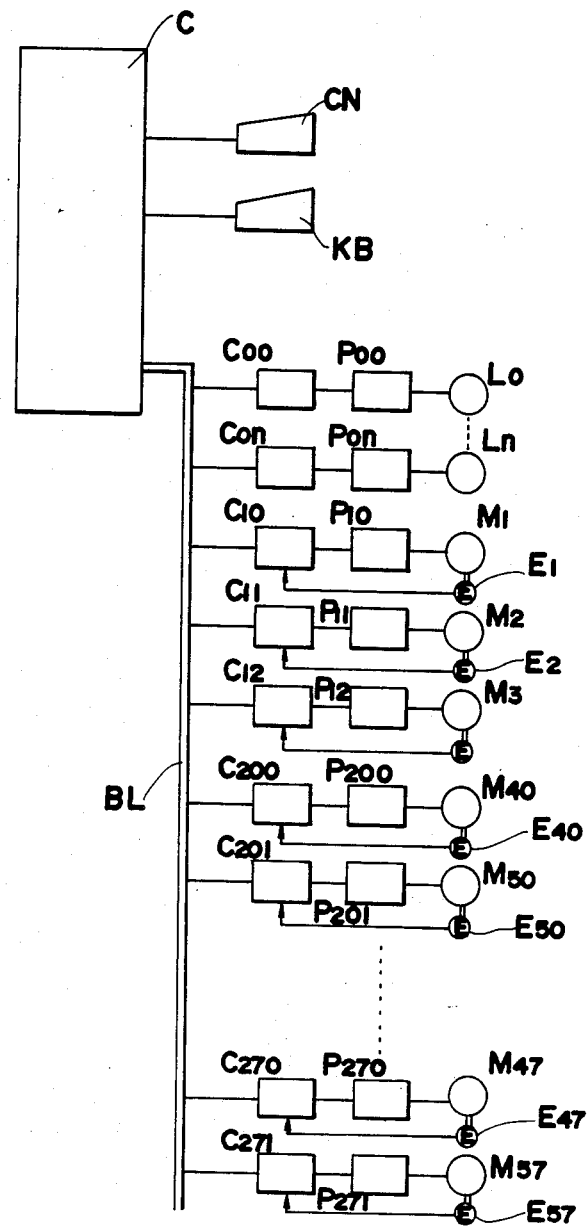

The star field projector 2 and planet projectors 3, 3 . . . and other devices and lamps can be controlled by the network shown in the block diagram of FIG. 7. In FIG. 7, a computer C comprises an information memory or storage which stores data required for control such as orbit equations of planets, etc. and programs for simulation. The computer C is connected with a keyboard KB for inputting programs and a console CN for inputting data for manual control. When a program once starts, commands for controlling various units are output in accordance with the programs. An output from computer C is carried by a bus line BL which is connected with various lamps $L_0, \ldots, L_n$ through the controllers $C_{00} \ldots C_{0n}$ and power supplies $P_{00} \ldots P_{0n}$ and also connected with the motors $M_1$, $M_2$, $M_3$ of star field projector 2 through the controllers $C_{10}$, $C_{11}$, $C_{12}$ and power supplies $P_{10}$, $P_{11}$, $P_{12}$. Moreover, it is connected with the motors $M_{40} \ldots 47 M_{50} \ldots 57$ for the axes I and II of planet projectors 3,3 . . . through the axes I and II of planet projectors 3,3 . . . through the controllers $C_{200}, C_{201}, C_{211}, \ldots, C_{270}, C_{271}$ and power supplies $P_{200}, P_{201}, P_{210}, P_{211}, \ldots, P_{270}, P_{271}$. The detection signals of encoders $E_1$, $E_2$, $E_3$, $E_{40} \ldots 7 \ldots E_{50} \ldots 7$ are fed back espectively to the controllers.

A control output to a motor is calculated by the computer C for a minute unit time and it is sent through the bus line BL as an angular displacement of motor shaft in a minute unit time. Each controller receives such data and drives a respective motor and rotates the motor correctly to the angle indicated by the data in accordance with the feed back signal from the encoder.

The simulation for the fixed stars carried out by the control network is the diurnal motions, precessional motions and latitude adjustments for the fixed stars. On the other hand, the motions of planets are annual motions but the way of control can be classified into the following three modes in accordance with the view points and moreover such way of control can be classified into two modes in accordance with the manner of moving the planets. In the first case, movement of the planets is simulated in accordance with their actual movements, and in the other case, the view or observation point or time is quickly changed irrespective of the actual movement of the planets.

First the three modes depending on the movement of the viewing or observation point are explained.

Mode J:

This mode selects the viewpoint to Sun, Moon, six planets (Mercury, Venus, Earth, Mars, Jupiter and Saturn) and the comet Halley (hereinafter these celestial bodies are referred to as J celestial bodies) and movement of other J celestial bodies viewed from one of these celestial bodies is simulated. Basically, this J celestial body moves over the sky in accordance with Kepler's laws and the position (located virtually on the dome which is the projection screen) of a J celstial body at a certain time can be determined in accordance with respective orbit equations. Planet data stored in the storage is expressed in the coordinate system around the Sun and it is corrected in accordance with the selected viewing position.

On the other hand, as to the data of fixed stars, the data of fixed star position viewed from the Earth is utilized since the viewing range is not substantially changed even when the viewing position is moved in the solar system.

This mode is further capable of changing the time of observation. Even in the other mode described later, the future or ancient time pattern can also be simulated, but change of time to the future or ancient time can be carried out by this processing mode. The time is all expressed by the Julian calendar.

Mode P:

This mode simulates the movement of other planets viewed from a moving body P which moves along a particular orbit. Namely, when an artificial satellite moves from a certain planet to another planet, respective movements of the planets as viewed from the artificial satellite can be simulated by this mode. For example, there can be known the movements of Mars and other planets viewed from the PIONEER, the Mars searching ship launched from the Earth flying toward Mars. The orbit of such artificial satellite is determined by the starting planet, target planet, desired arrival time and starting time which is the present time.

Mode L:

This mode simulates the movement of the planets as viewed from a movable body L which moves linearly at an adequate equal speed in the desired direction from the present viewing point. For example, movements of planets can be simulated in such a case where the linearly movable body L comes close to the solar system along the normal line drawn from the Sun at the ecliptic plane thereof.

Two modes of the way for moving planets are explained hereunder.

Figure 8:
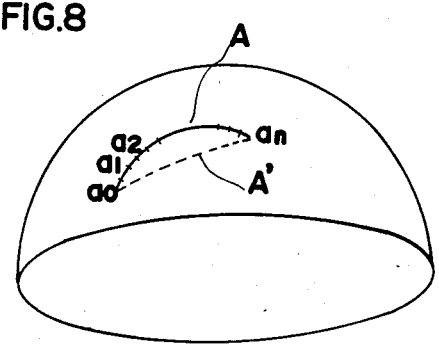
FIG. 8 shows a profile illustrating the quick mode and trace mode in the present invention.

Trace mode:

In the above three modes, movements of the planets are determined by the relation between the movements of viewing point and the orbits of the celestial bodies such as planets. The planetarium simulates the movements of the planets thus determined in a condition that the position of the star field projector is considered as the fixed observation or viewing point. The mode for simulating the actual movements of the plants as mentioned above is called the trace mode. In this mode, the distance which the projected image moves on the dome considered as the celestial sphere within a minute until time is set as the calculation interval which is converted into a number of days and the displacing angle of the two axes of the projector required by the projected image to move from the position of the present time to the position of the present time plus a calculated interval is calculated for each minute unit time and is then output. In FIG. 8, in case planets move on the celestial sphere to the position $a_n$ of the present time through locus A, the positions to be moved next are calculated for each minute unit time such as $a_0 a_1 \ldots a_n$ and thereby actually viewed movements of the planets are simulated.

Quick mode:

In case the observation point is shifted or the present time is changed, it is sometimes enough that a projected image reaches the target position on the celestial sphere and movement of the planet in the actual course is unnecessary. For example, in case of simulating the starry sky of the first year of A.D., it is not required to reproduce the movements of planets during about 2000 years from the present time to the first year of A.D. In such a case, the projectors are so controlled that the planets are moved through the shortest path connecting the present position and the target position. The mode where the planets are quickly moved to the target position without relation to the actual movement of planets is called the quick mode. In FIG. 8, the planets move the route A' which is equal to the shortened distance between the present position $a_0$ and target position a. The quick mode is used in the mode J and mode L mentioned above.

This shortest route passes through the shortest distance on the projecting surface of dome 1, and when the control is carried out so that the projected image traverses this route, the amount of movement of the two axes of projector 3 becomes minimum. In the case of the quick mode, it is no longer necessary to project an image.

Figure 9A:
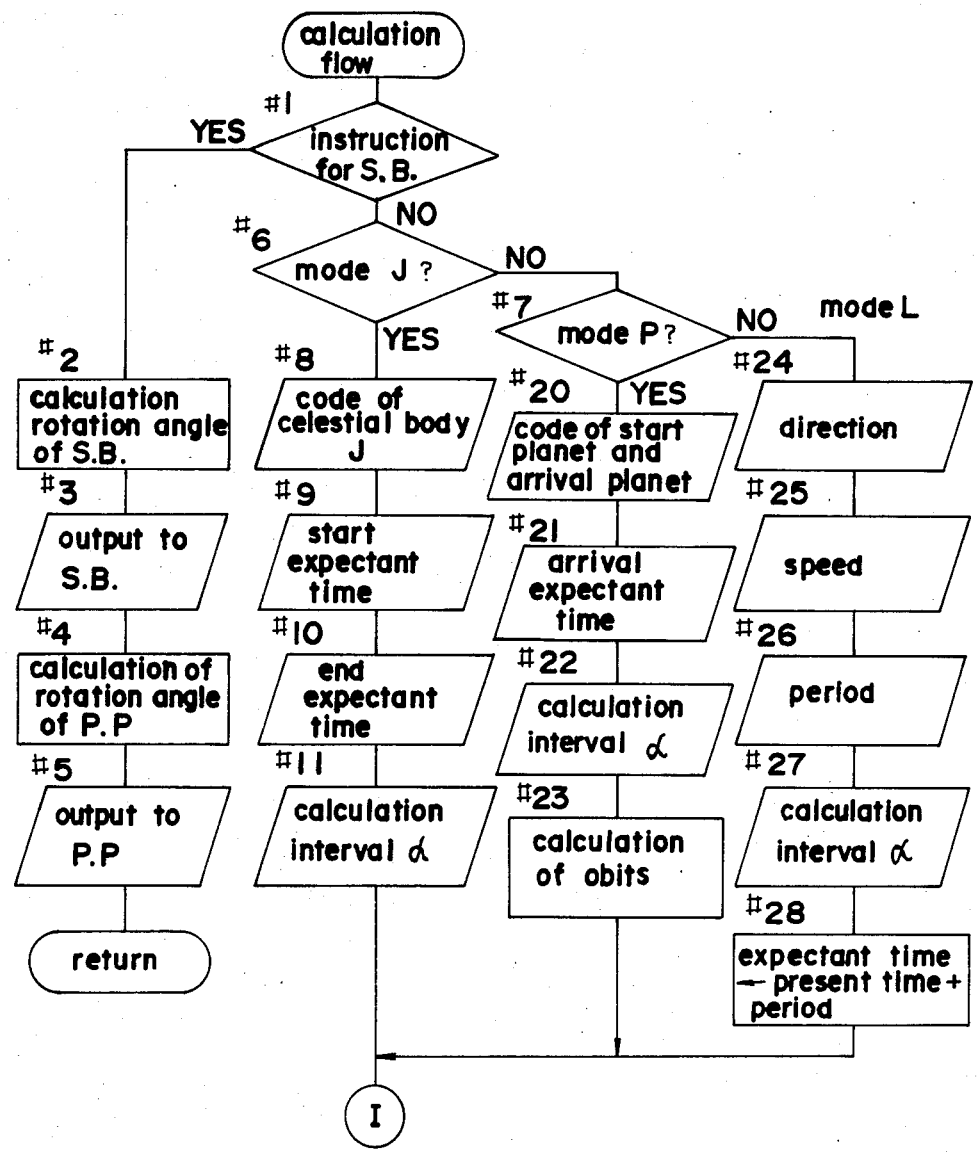
FIGS. 9A and 9B are flow charts of the control of the planetarium of the present invention.
Figure 9B:
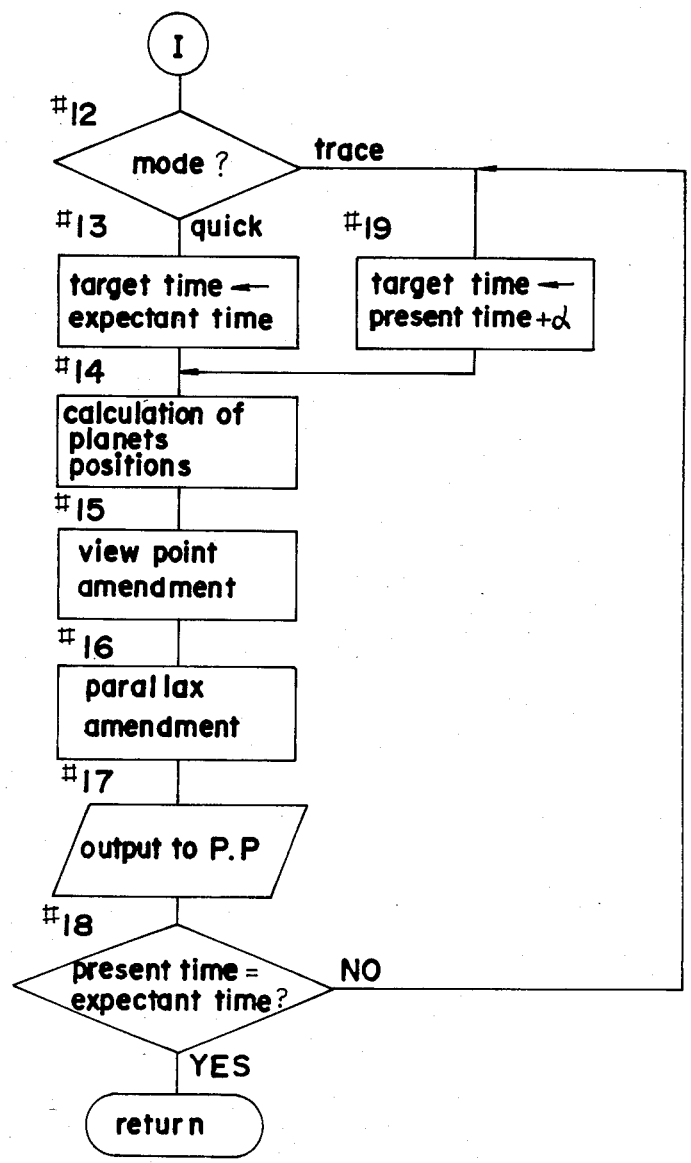

The above modes are explained by using a sub-routine of calculation flow shown in FIGS. 9A, 9B. This flow chart is a part of the flow chart of computer C, which calculates outputs to the motors which in turn drive the star field projector and planet projectors. The computer C outputs control instructions in accordance with a previously loaded program. Moreover, it is presumed that the present observation point and the present time referred to in this flow chart are to be sequentially updated and stored in the computer C and the time data are all expressed according to the Julian calendar.

In step 1 of the flow chart, an instruction is examined as to whether it is issued for driving the star field projector or the planet projector. SB is an abbreviated term for a star ball, namely a fixed star projection ball. If the decision is YES, the rotating angles of the three axes of the star ball are calculated in step 2 in accordance with the instruction of diurnal motion, precessional motion or latitude adjustment, the present time and calculation time interval (indicating the degree of time interval for projection per calculation time interval) included in the SB motor instruction and it is output in step 3. In step 4, the rotating angles of the two axes are calculated so that the planet projector is directed to the position of the planet at the present time, and it is output in step 5 and the operation returns to the main routine.

When the SB motion insturction is not issued in step 2, an instruction for the annual motion of the planet is issued and the modes J, P, L included in this instruction are decided in the steps 6 and 7.

In the case of mode J, the J code indicating selected celestial body J programmed previously, desired or expectant time for starting presentation, desired time for ending presentation and the calculation interval (days$\alpha$) for presenting the annual motion are read from the memory in steps 8, 9, 10, 11. In step 12, the quick mode or trace mode is decided. The data for the quick mode or trace mode can be contained, for example in one bit of data indicating mode J. In the case of the quick mode, the start expectant time read in step 9 is set to the target time (in step 13). In step 14, the positions of the planet (celestial body J) and moving bodies P, L are calculated (this calculation is made in the coordinate system around the Sun), and the position of each planet viewed from the view point (designated celestial body J in the case of mode J) in step 15 is calculated in step 15 on the basis of the calculation result in step 14. Next, since the planet projectors are arranged at the positions offset from the star field projector, the calculation for correcting parallax due to a difference in projecting position is carried out in step 16 and output is fed to the planet projector in step 17. As in the case of steps 3 and 5, an output is obtained for the rotating angle of the two axes for directing the projector to the target. Thereafter, it is decided whether or not the present time is the desired starting time in step 18. In the case of the quick mode, the present time is immediately changed to the desired starting time and therefore the decision in step 18 is YES and the operation returns to the main routine.

The observation point is shifted to the desired celestial body J or the simulation starting time is set freely by using mode J as the quick mode.

In case the mode J is used as the trace mode, operations shift to steps 1, 6, 8, 9, 10 and 11 the same as in the above case, and the mode is decided as the trace mode in step 12. Then, the time which indicates the calculation interval $\alpha$ read at step 11 is added to the present time and the result is set as the target time in step 19. The position of the projected image at the target time is calculated in steps 13 to 16 and such data is output in step 17. In step 18, it is decided whether the present time is the desired time for ending the simulation read in step 10. When the result is NO, processing returns to step 19 and steps 13 to 18 are repeated. Thereby, the simulation is carried out for each calculation interval $\alpha$ along the locus A of FIG. 8.

In the mode P, when this mode starts, the starting planet code, target planet code, desired target time and calculation interval $\alpha$ are read from the memory in steps 20, 21, 22 and the orbit of moving body P is calculated in step 23. Next, the processing moves to step 12. However, in this embodiment, since the mode P is used only in the trace mode, processing advances to step 19 from step 12. If the present observation point is different from the starting planet, the present observation point is matched to the starting planet by using the mode J of the quick mode but this processing is omittd from the flow chart.

In step 19 of the flow chart, the calculation interval $\alpha$ read in step 22 is added to the current time to obtain the target time and positions of moving body P and planets at the target time are calculated in step 14. In step 15, the position of the planet is corrected the position where the view position is set on the moving body P, and in step 16, the calculation for correcting parallax due to the setting position of the planet projectors is carried out. The result is output in step 17. The processings of steps 13 to 19 are repeated until the present time matches the desired time.

As explained above, the movement of planets viewed from the moving body P passing the particular orbit from a certain planet to another planet can be simulated.

The mode L is used in the quick mode or trace mode. When it is used in the quick mode, it serves to move the viewing point to the desired position of the sky. For example, this mode is used for moving the viewing point for a simulation in which the viewing point is moved to a position vertically offset from the revolutional orbit plane of the Earth by one astronomical unit and the solar system is viewed from such position.

In steps 24, 25, 26, 27 of the flow chart, the direction where a moving body L performs a linear movement at the equal speed travels (this direction is equal to the direction of view point), the speed of the moving body L, the period of movement and calculation interval $\alpha$ are read from the memory. In step 28, a period is added to the present time to obtain the desired time. This desired time is considered as the target time in step 13 in the quick mode. On the other hand, in the case of the trace mode, the time where the calculation interval $\alpha$ is added to the present time is considered as the target time in step 19. Accordingly, in the quick mode the calculations for position are carried out at the end of all periods (steps 14, 15, 16) and the results are output (step 17). Meanwhile, in the case of the trace mode, calculation for position is carried out for each calculation interval $\alpha$ and the results are output (steps 14 to 17) at each timing. Such processings are continued until the end of all periods (steps 14 to 19).

The mode L in the quick mode is capable of shifting the viewing point to th desired position of the sky, while the mode L in the trace mode is capable of simulating the movements of planets viewed from a moving body L which is continuously traversing a straight uniform motion in the desired direction and speed. The mode L in the trace mode can also simulate the movements of planets under the condition that a moving body stops at a point in the sky. In this case, the speed must be set to "0".

In the above quick mode, the movement of the planet projector between the starting position or time and arrival position or time is carried out througth the shortest route and thereby the time or the viewing point can be changed quickly. It is a large merit of this mode.

Figure 10A:
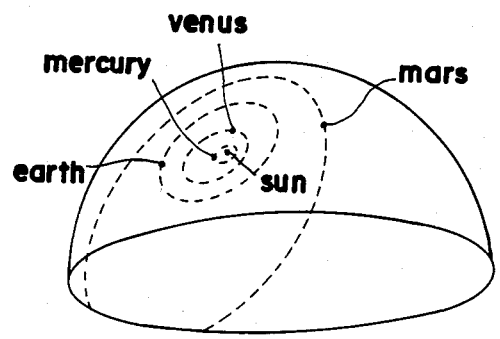
FIGS. 10A and 10B are profiles indicating an example of the projections of the planets.
Figure 10B:
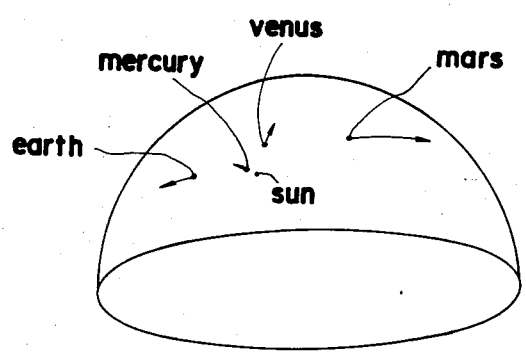

By way of example of the simulation by the planetarium of the present invention in which the viewing point is shifted to a position spaced by an astronomical unit from the Earth in the direction perpendicular to the orbit plane of revolution of Earth, the viewing direction is changed toward the Sun at such point, the solar system is viewed from such point, and thereafter the viewing point is moved at a constant speed toward the Sun. The viewing point is first moved to the position spaced by an astronomical unit from the Earth in the quick mode. In this case, the moving distance is determined by the speed and period. Therefore, it may be enough to set the speed to an astronomical unit/day and the period to a day. When the movement is completed, since the viewing direction is directed toward the outside of the solar system, the direction is oriented toward the Sun and the processing for stationarily viewing the solar system at the aforesaid position is carried out in the trace mode. In this processing, "direction" is set toward the Sun and "speed" is set to 0. If the observing period is one year, it is curtailed to only 10 minutes for reproduction, and the unit time of calculation is 1 msec, the "period" becomes 365 days and "calculation interval"

become 0.876 minutes. In this case, the simulation where mainly the interior planets move in the orbits as shown in FIG. 10A is observed. Next, when the view point is being moved linearly and uniformly toward the Sun by using the trace mode, each planet moves in the direction being away from the Sun as shown in FIG. 10B.

The above explained simulation is only an example of the diversified simulations which can be performed in the present invention. In summary, the present invention permits various modifications of the simulations by introducing a guide mode of operation not restricted by the actual movements of planets, etc. during the processing for simulations.

Although the present invention has been fully described by way of example with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A planetarium having a star field first projector for the fixed stars and a plurality of second projectors for the planets or the like which are separated from the star field projector and are each driven by two motors for effecting the combined motions of two axes, comprising;

means for controlling the motion of each second projector in accordance with two modes which in the first mode the second projector is moved so as to trace the actual motion of the planet or the like and in the second mode the second projector is moved from the start position to the target position through the shortest route unrelated to the actual motion of the planet or the like whereby a position of the planet or the like to be projected is rapidly changed.

2. A planetarium as claimed in claim 1, wherein said two axes are contained in a plane substantially parallel to the projection limit over which the images of stars are projected.

3. A planetarium as claimed in claim 2, wherein said plane is disposed below said projection limit.

4. A planetarium as claimed in claim 2, wherein said plane is inclined to the horizontal.

5. A planetarium as claimed in claim 1, wherein each of said second projectors has drive circuits connected to and controlling each of said respective motors.

6. A planetarium as claimed in claim 5, wherein the control means outputs data to the drive circuit for driving the motor.

7. A planetarium as claimed in claim 6, wherein the control means calculates the data to be output to the drive circuits in order to move the projecting image from a present position to a next position, and in the first mode said next position is established as a position provided by dividing the distance along the planet orbits between the start position and a predetermined end expectant position into minute intervals, and in the second mode said next position is established as the end expectant position.

8. A planetarium as claimed in claim 7, wherein each of said positions is measured in Julian days.

9. A planetarium comprising:
   a projection screen;
   a first projector for projecting an image of a star field on said projection screen;
   at least one second projector spaced from said first projector and movable about a pair of angularly related axes to project on said screen an image of a celestial body movable relative to said star field;
   a pair of drive motors for rotating said second projector about said axes to vary the orientation thereof and the position of said image in said screen; and
   means for controlling the actuation of said drive motor and characterized in that said controlling means is alternatively operable in a plurality of modes including a first mode in which said image traverses on said screen a path corresponding to the actual apparant normal path of said celestial body relative to said star field and a second mode in which said image is transferred from an initial point to a terminal point at positions in accordance with the times and positions of observation of the celestial body along a path shorter than and different from said normal path.

10. The planetarium of claim 9 wherein said second axes of rotation of said second projector are mutually perpendicular.

11. The planetarium of claim 9 including a plurality of said second projectors and corresponding pair of drive means.

12. The planetarium of claim 11 wherein a plurality of said second projectors project onto said screen the image of a respective planet and the normal projected path of each of said planets on said screen is the apparent orbit thereof as viewed at predetermined times and points of observation.

13. The planetarium of claim 12 wherein said control means includes a computer having stored in its memory the orbital equations of said planets.

* * * * *